United States Patent [19]

Sansone et al.

[11] Patent Number: 5,487,511
[45] Date of Patent: Jan. 30, 1996

[54] BLENDER BLADES AND SYSTEM ADAPTED FOR ICE CRUSHING

[75] Inventors: Arthur J. Sansone, Stamford, Conn.; Asik Braginsky, Forest Hills, N.Y.

[73] Assignee: Conair Corporation, Stamford, Conn.

[21] Appl. No.: 289,427

[22] Filed: Aug. 12, 1994

[51] Int. Cl.[6] .............................. B02C 18/12; B02C 18/20
[52] U.S. Cl. ........................... 241/282.1; 241/282.2; 241/292.1
[58] Field of Search ............................ 241/152.2, 165.5, 241/282.1, 282.2, 292.1

[56] References Cited

U.S. PATENT DOCUMENTS

| | | | |
|---|---|---|---|
| 2,284,155 | 5/1942 | Landgraf | 241/282.2 |
| 2,930,596 | 3/1960 | Waters | 241/282.1 X |
| 3,216,473 | 11/1965 | Dewenter | 241/282.1 X |
| 3,240,246 | 3/1966 | DeWenter | 241/282.1 X |
| 4,887,909 | 12/1989 | Bennett | 241/282.2 X |

FOREIGN PATENT DOCUMENTS

| | | | |
|---|---|---|---|
| 59404 | 1/1954 | France | 241/282.2 |
| 159570 | 7/1957 | Sweden | 241/282.2 |
| 650869 | 3/1951 | United Kingdom | 241/282.2 |

*Primary Examiner*—Timothy V. Eley
*Attorney, Agent, or Firm*—Haynes N. Johnson

[57] ABSTRACT

Two pairs of blender blades for crushing ice, one of which pairs extends upwardly and the other of which extends downwardly. The blades of the upwardly-extending pair are similar in size and shape; but one of the pair is at a sharper angle to the axis of rotation than is the other. The leading edges of this pair are involute. i.e., are convex towards their base and concave toward their tips. The downwardly-extending pair of blades are similar in shape and size and are at the same angle to the axis of rotation.

12 Claims, 3 Drawing Sheets

BLENDER BLADES AND SYSTEM ADAPTED FOR ICE CRUSHING

FIELD OF THE INVENTION

This invention relates to the field of food blenders, and, in particular, to a food blender blade which rapidly and efficiently crushes ice. The objective is to convert ice into fine snow, with no remaining chips or chunks of ice, by using a blade which is also serviceable for pulverizing foods.

BACKGROUND OF THE INVENTION

In the past, blenders have been used primarily for preparing foods, and their blades have been adapted for that purpose. Any use of the blender for ice crushing was secondary, with the crushing quality not being a significant design factor.

Various shapes of blender blades have been used. In many cases two pairs of blades would be used, with a first pair angling upward, and a second pair angling downward. Examples of such blades can be found in various United States Patents, such as: Landgraf U.S. Pat. No. 2,309,347; Malz U.S. Pat. No. 2,758,623; Seyfried U.S. Pat. No. 2,771,111; Jepson U.S. Pat. No. 3,175,594; Knapp U.S. Pat. No. 3,036,614; Voglesonger U.S. Pat. No. 4,087,053; and Ernster U.S. Pat. No. 4,462,694. Though many of these patents disclose pairs of blender blades, none disclose the particular structure of my invention which works so well in ice crushing. None discloses a pair of upwardly-extending blades of similar configuration, but at different angles to the axis, and with leading edges which are slightly concave so as to catch and hold ice while crushing it. None discloses such a pair of blades positioned such that one extends upwardly more than the other so that it is the first to hit and crush the ice, while the other, lower blade, serves to continue the chipping.

BRIEF SUMMARY OF THE INVENTION

My ice-crushing blender blades include two pairs of blades, an upwardly-extending pair and, below them, a downwardly-extending pair. The former are asymmetrical; the latter are symmetrical. The bases of both pairs are mounted upon a vertical axis for rotation.

The upwardly-extending pair of blades includes a first blade and a second blade. Though the two blades are of the same length and shape, the first blade extends further upward than does the second blade, since the first blade is at an angle more nearly approaching the axis than is the second blade. Both blades have leading and trailing edges, the leading edges of both blades of them being slightly concave and sharpened.

The leading edges of both blades of the upwardly-extending pair are involutely scalloped, that is, they have a concave portion adjacent the base and a convex portion between there and the tip. The convex portion has a greater radius than the concave portion. The leading edges are only slightly concave, with a greater radius than is found on the trailing edges.

Initial ice chipping is done by the first blade, after which the ice falls between the blades and is further crushed by the second blade.

The downwardly-extending pair of blades includes a first blade and a second blade. The two blades are symmetrical; they are of the same length, have the same configuration, and extend downwardly the same distance and at the same angle. Both blades have leading and trailing edges, the leading edges of both of them being sharpened on the lower surface. The leading edges of both blades are essentially straight, but have a slight concavity. The trailing edges of both blades are involute, with the concave radius near the base being less than the convex radius near the tip.

The leading edges of the upwardly-extending blades are at a lesser angle to the axis than are the trailing edges; the concave scoop-shape of these leading edges tends to lift the ice as it is being cut, enhancing the chipping action. The curvature of all of the blades is smooth, with no sharp angles.

The upwardly-extending pair of blades are primarily responsible for the ice crushing features, but, as the cut particles fall to the bottom of the jar, the downwardly-extending pair of blades further pulverizes the chips.

The blender jar has an internal horizontal cross-section having a square shape with rounded corners, and internally directed vertical ridges on each side which tend to create an inwardly-extending vortex, enhancing the ice-chipping action.

DETAILED DESCRIPTION OF THE INVENTION

Figure 1:
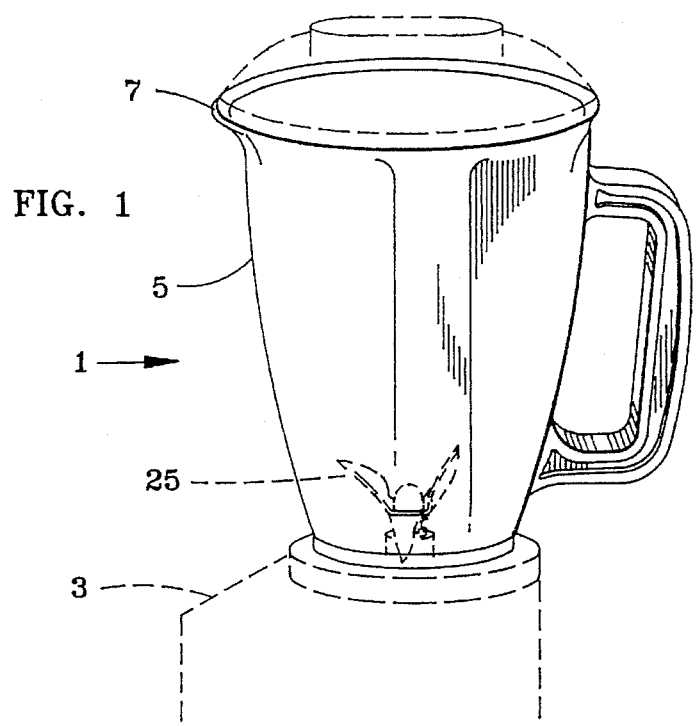
FIG. 1 is a perspective view of a blender.

My ice-crushing blender system 1 includes a motor base 3 with a jar 5 mounted on top of it in the usual fashion. The jar 5 has an upper lip 7, flat inner sides 9, forming a horizontal cross section which is generally square with rounded corners 11. Each side 9 carries a vertical ridge 13 directed inwardly. The base 15 of the jar carries the usual mount 17 for the blades with a vertical rotating hub or axle 19.

Figure 2:
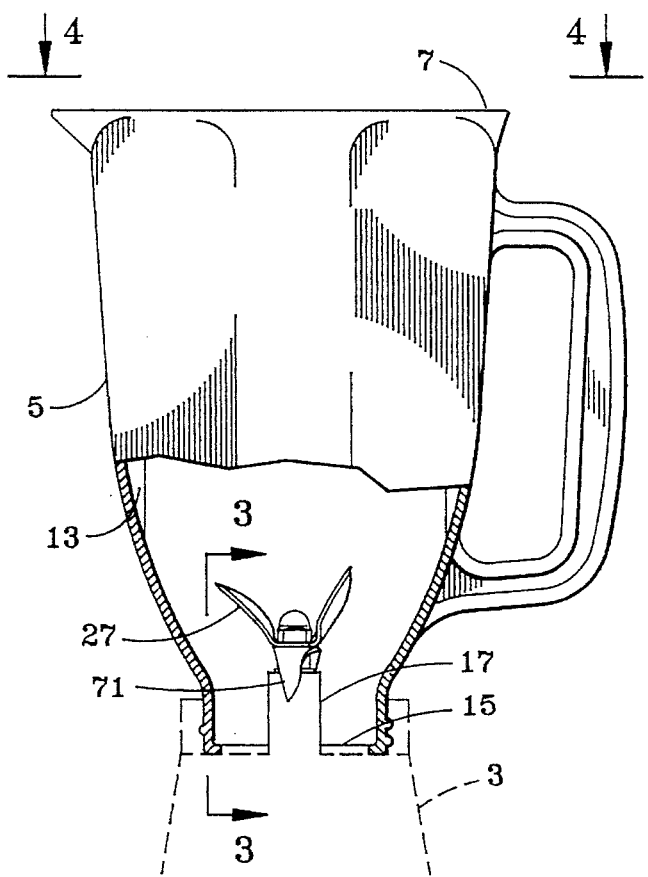
FIG. 2 is a side elevation of a blender, cut away to show the blender blades.
Figure 3:
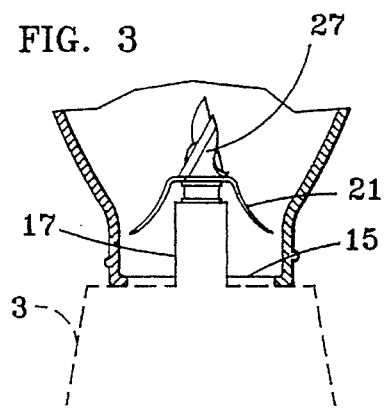
FIG. 3 is a section, taken on line 3—3 of FIG. 2.
Figure 4:
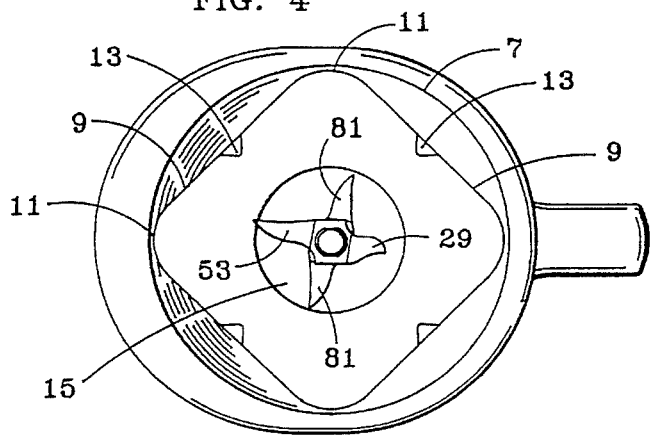
FIG. 4 is a top plan view, taken on line 4—4 of FIG. 2
Figure 15:
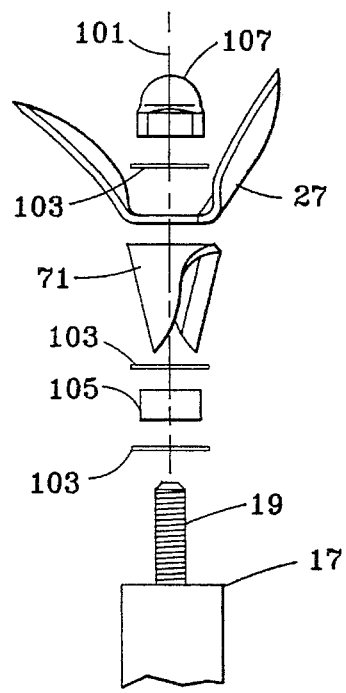
FIG. 15 is an exploded view showing the assembly of the blades on the axle of the blender.

Two pairs of blades 27 and 71 are mounted on the hub 19 (FIGS. 2, 3, and 15). Blades 27 extend upwardly, and blades 71 extend downwardly. Blades 27 have a base 30 with a socket 31 to fit about the hub; and blades 71 have a base 75 with a socket 77 to fit about the hub. The sockets hold the pairs perpendicular to one another on the hub, that is, the upper blades are ninety degrees removed from the lower blades.

The pair of upwardly extending blades 27 are shown in FIGS. 5 to 9. They rotate about axis 28 which coincides with the axle 19 of the hub. This pair includes first blade 29 and second blade 53. Both blades are of similar configuration and both are angled upwardly; but blade 29 is at an angle closer to axis 28 than is blade 53. Thus, first blade 29 extends upwardly to a level such that its tip 39 is on a level higher than tip 60 of second blade 53. Accordingly, blade 29 is the first to crush ice put into jar 5.

Figure 5:
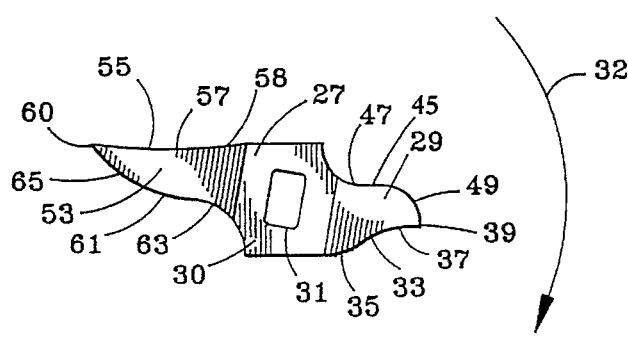
FIG. 5 is a plan view of the upwardly-extending pair of blades.
Figure 6:
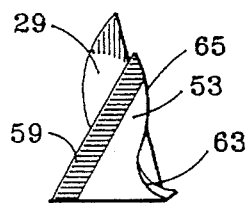
FIG. 6 is a right side elevation of the blades.
Figure 7:
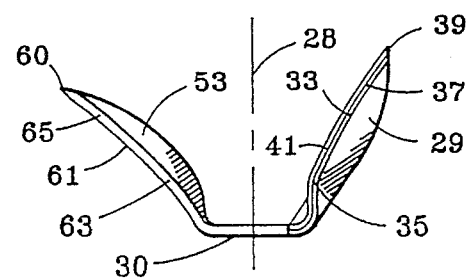
FIG. 7 is a front elevation of the blades.
Figure 8:
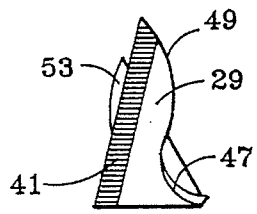
FIG. 8 is a left side elevation of the blades.
Figure 9:
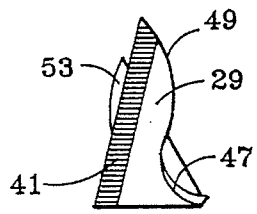
FIG. 9 is a bottom plan view of the blades.
Figure 10:
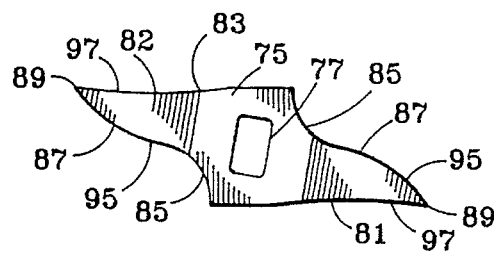
FIG. 10 is a top plan view of the downwardly-extending pair of blades.
Figure 11:
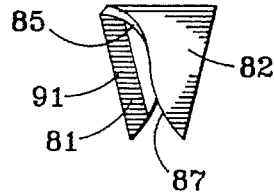
FIG. 11 is a right side elevation of the blades.

Blades 29 and 53 rotate in a clockwise direction as seen in FIG. 5 (the direction of the arrow 32). The first blade 29 has a leading edge 33, which is sharpened 41. Leading edge 33 has an involute shape with concave portion 37 and convex portion 35, the concave portion being nearest to the tip 39. (By "involute", we mean including both a concave and a convex portion, the two portions together forming a smooth curve). Thus, the portion of the blade which first hits the ice is concave. The concavity results in the ice being "captured" by the blade in the sense that the concavity reduces the likelihood of the ice being thrown either upwardly or downwardly (as could be the case if the edge were convex). This means that the ice takes the full blow of the blade without sliding on it; and, so, is most likely to be crushed.

Second blade 53 has a shape similar to that of the first blade, but the second blade is not tilted upwardly quite as much. The second blade is also involute, having a concave portion 57 and a convex portion 58. As with the first blade the concave portion has a shorter radius than does the convex portion, with the concave portion being nearest to the tip 60. The trailing edge 61 of this blade 53 includes a concave portion 63 nearest the hub and a convex portion 65 nearest the tip.

Both the first and second blades 29 and 53 have their respective leading edges 33 and 55 elevated slightly above their trailing edges 45 and 61. This tends to cause ice to be thrown not only inwardly, but also upwardly, providing another opportunity for the ice to be crushed.

The pair of downwardly-extending blades 71, first blade 81 and second blade 82, are shown in FIGS. 10 to 14. The two blades have common base 75 with socket opening 77. They have an axis 73 which is coincident with the axis 101 of hub 19.

Figure 12:
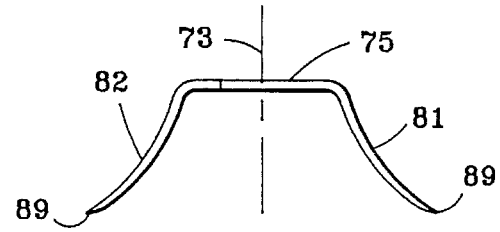
FIG. 12 is a vertical section through the blades.
Figure 13:
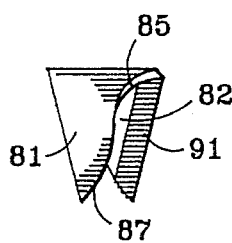
FIG. 13 is a left side elevation of the blades.
Figure 14:
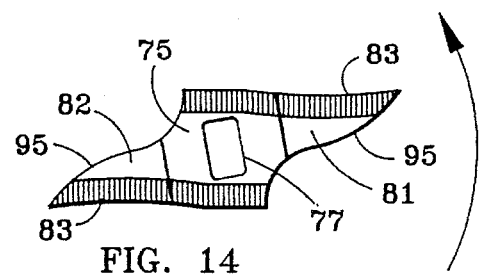
FIG. 14 is a bottom plan view of the blades.

Blades 81 and 82 are preferably the same and symmetrical. Each has a leading edge 83 with a slightly concave portion 97 running from the base to the tip 89. The leading edge is sharpened 91. The trailing edges 95 are involute, having a concave portion 85 adjacent the base 75 and a convex portion 87 between the concave portion and the tip 89. Both blades curve outwardly from base 75 (FIG. 12).

Both sets of blades are made of stainless steel.

The assembly of upper blades 27 and lower blades 71 is shown in FIG. 15. The blades, together with necessary washers 103 and a spacer 105 are fitted about hub 19 and are held in place with an acorn nut 107. Once assembled within jar 5, the unit is ready for use.

In use, ice is placed within jar 3 and the motor in motor base 3 is turned on. The initial chipping is done by the first upwardly-extending blade 29. The ice then falls between the pair 27 of upwardly-extending blades 29 and 53; and the second upwardly-extending blade 59 cuts the ice further. By contrast, prior art blender blades tended to cause the ice to sit on top of the blades and not break up. The particles cut by blade 59 fall to the bottom of the jar and are crushed and pulverized further by the pair of downwardly-extending blades.

The blades and jar are sized and shaped to provide the optimum distance between the blade and the jar wall. The square shape of the jar, with the flat inner sides 9 and the rounded corners 11, provide the optimum distance between the blade and the jar wall. The rounded corners produce a vortex that causes food and/or ice to fall into the paths of the blades.

The objective in crushing ice is to produce 100% snow. Our blades will do this, whereas many prior art devices produce only fine chips. Our blades, however, are also usable for blending food.

I claim:

1. A set of blades for use in a blender, said blender including a jar, a base, and an associated motor, said set of blades including a pair of upwardly-extending blades, including a first upwardly-extending blade and a second upwardly-extending blade, said pair having a common first base and a first axis of rotation perpendicular to said common first base, said blades being of substantially the same shape and configuration, and said first upwardly-extending blade being at a lesser angle relative to said first axis than the angle of said second upwardly-extending blade relative to said first axis, whereby said first upwardly-extending blade extends further in the direction of said first axis than said second upwardly-extending blade, each of said upwardly-extending blades having a leading edge and each said leading edge being of involute shape with a convex portion and a concave portion, a pair of downwardly-extending blades, including a first downwardly-extending blade and a second downwardly-extending blade, said pair of downwardly-extending blades having a common second base and a second axis of rotation perpendicular to said common second base, and said pair of upwardly-extending blades and said pair of downwardly-extending base being mounted together for common rotation with said first axis and said second axis in alignment with one another.

2. A set of blades as set forth in claim 1 in which said downwardly-extending blades are similar in size and shape and are at similar angles relative to said common second axis.

3. A set of blades as set forth in claim 1 in which each of said upwardly-extending blades has a leading edge and a trailing edge, and each of said leading edges is at a lesser angle relative to said common first axis than is its respective trailing edge, as measured from said first common base.

4. A set of blades as set forth in claim 1 in which said concave portion is farther from said first common base than is said convex portion.

5. A blender including a blender jar, a blender base for said blender jar, said blender base having a motor therein with a vertically-extending axis, a pair of upwardly-extending blades, including a first upwardly-extending blade and a second upwardly-extending blade, said pair having a common first base and a first axis of rotation perpendicular to said common first base and coincident with said vertically-extending axis, said blades being of substantially the same shape and configuration, and said first upwardly-extending blade being at a lesser angle relative to said first axis than the angle of said second upwardly-extending blade relative to said first axis, whereby said first upwardly-extending blade extends further in the direction of said first axis than said second upwardly-extending blade, each of said upwardly-extending blades having a leading edge and each said leading edge being of involute shape with a convex portion and a concave portion, a pair of downwardly-extending blades, including a first downwardly-extending blade and a second downwardly-extending blade, said pair of downwardly-extending blades having a common second base and a second axis of rotation perpendicular to said common second base, and said pair of upwardly-extending blades and said pair of downwardly-extending base being mounted together for common rotation with said first axis and said second axis in alignment with one another.

6. A set of blades as set forth in claim 5 in which said downwardly-extending blades are similar in size and shape and are at similar angles relative to said common second axis.

7. A set of blades as set forth in claim 5 in which each of said upwardly-extending blades has a leading edge and a trailing edge, and each of said leading edges is at a lesser angle relative to said common first axis than is its respective trailing edge as measured from said common first base.

8. A blender as set forth in claim 5 in which said concave portion is farther from said first common base than is said convex portion.

9. A set of blades for use in a blender, said blender including a jar, a base, and an associated motor, said set of blades including a pair of upwardly-extending blades, including a first upwardly-extending blade and a second upwardly-extending blade, said pair having a common first base and a first axis of rotation perpendicular to said common first base, and said first upwardly-extending blade being at a lesser angle relative to said first axis than the angle of said second upwardly-extending blade relative to said first axis, whereby said first upwardly-extending blade extends further in the direction of said first axis than said second upwardly-extending blade, each of said upwardly-extending blades having a leading edge and each said leading edge being of involute shape with a convex portion and a concave portion, a pair of downwardly-extending blades, including a first downwardly-extending blade and a second downwardly-extending blade, said pair of downwardly-extending blades having a common second base and a second axis of rotation perpendicular to said common second base, and said pair of upwardly-extending blades and said pair of downwardly-extending base being mounted together for common rotation with said first axis and said second axis in alignment with one another.

10. A set of blades as set forth in claim 9 in which said concave portion is farther from said first common base than is said convex portion.

11. A blender including a blender jar, a blender base for said blender jar, said blender base having a motor therein with a vertically-extending axis, a pair of upwardly-extending blades, including a first upwardly-extending blade and a second upwardly-extending blade, said pair having a common first base and a first axis of rotation perpendicular to said common first base and coincident with said vertically-extending axis, and said first upwardly-extending blade being at a lesser angle relative to said first axis than the angle of said second upwardly-extending blade relative to said first axis, whereby said first upwardly-extending blade extends further in the direction of said first axis than said second upwardly-extending blade, each of said upwardly-extending blades having a leading edge and each said leading edge being of involute shape with a convex portion and a concave portion, a pair of downwardly-extending blades, including a first downwardly-extending blade and a second downwardly-extending blade, said pair of downwardly-extending blades having a common second base and a second axis of rotation perpendicular to said common second base, and said pair of upwardly-extending blades and said pair of downwardly-extending base being mounted together for common rotation with said first axis and said second axis in alignment with one another.

12. A blender as set forth in claim 11 in which said concave portion is farther from said first common base than is said convex portion.

* * * * *